United States Patent Office

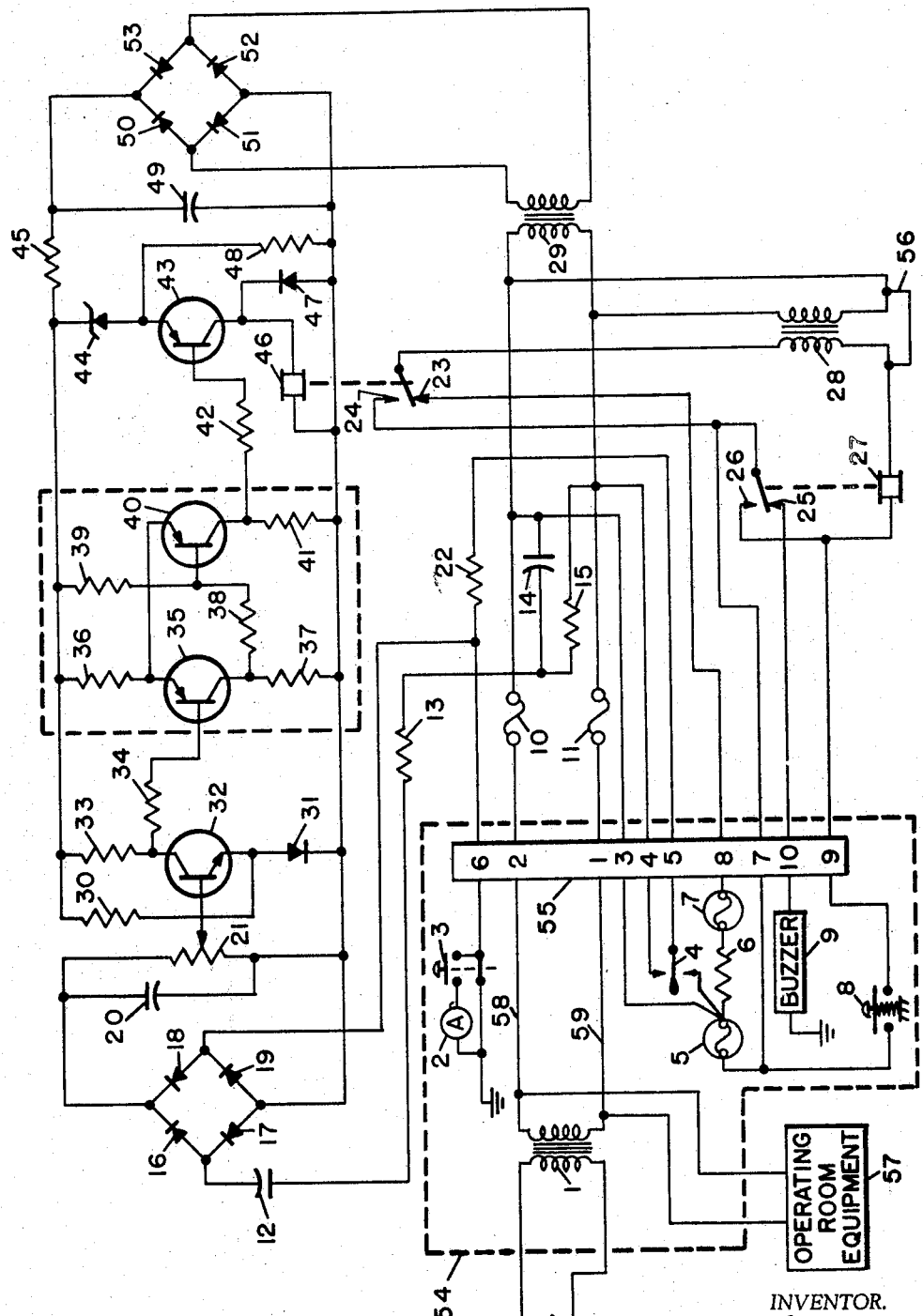

3,492,567
Patented Jan. 27, 1970

3,492,567
APPARATUS FOR DETECTING OPERATING ROOM ELECTRICAL LINE GROUND FAULTS
Basil D. Rissolo, Monroe, Conn., assignor to Edwards Company, Inc., Norwalk, Conn., a corporation of Connecticut
Filed Jan. 25, 1967, Ser. No. 611,707
Int. Cl. G01r *31/02, 31/12;* G08b *21/00*
U.S. Cl. 324—51                                  1 Claim

ABSTRACT OF THE DISCLOSURE

A ground fault detector having a bridge detector for sensing the level of impedance to ground of the lines of an alternating current power supply and control circuitry for the actuating of indicators relative to such impedance levels.

BACKGROUND OF INVENTION

This invention relates to a ground detector for use in hospital operating rooms. More particularly, it is concerned with the determining when resistance or capacitive reactance to ground of either line of an isolated alternating current power supply falls below a predetermined specified value.

Catastrophic explosions and fires can and do occur in operating rooms due to the ignition of flammable gases, e.g., cyclopropane or ether. Such occurrences often produce serious and sometimes fatal results to both patients and operating room personnel. A primary source of detonation is the spark hazard associated with electrostatic discharge between objects of different potential, another source is the spark and arc hazard introduced by insulation failures of electrical appliances and equipment necessarily present in operating rooms. The electrical devices also present severe shock hazards to patients and personnel.

To obviate the possibility of electrostatic discharge, it is specified that both personnel and equipment present in hazardous locations be adequately bonded to ground. This is attained by such means as conductive flooring, conductive clothing, and actual electrical bonding. Eliminating the danger of electrostatic discharge by grounding, however, aggravates both the arc and shock hazard associated with the electrical power source by multiplying the number of low conductance paths to ground.

Avoidance of electrical power shock and spark hazard is achieved, as specified in the code, viz NFPA No. 56, by isolating from ground the source of electrical energy. Isolating the power from ground prevents the completion of low impedance paths when the power lines come in contact with grounded personnel and equipment. Power supply isolation is established by use of an isolation transformer which secondary is completely isolated from ground except for a small capacitive leakage. All operating equipment located in hazardous areas, i.e., below a level of 5 feet as specified in the code, is powered from the isolated secondary winding.

The maintenance of this isolation is of prime importance to the safety of the room and the personnel contained within. During the course of an operation, the surgeon who assumes control of the room must constantly be alert to the creation of any condition creating a potential shock or spark hazard. The present invention provides equipment whereby the resistance or capacitive reactance to ground of the power source is continuously monitored and any decrease in magnitude below a specified value is immediately made known to the surgeon and those other personnel in attendance at the operation.

SUMMARY

Briefly speaking, this invention, utilizing a bridge detector circuit, simultaneously senses any change in resistance or capacitive reactance of the lines of the power source to ground. The change is reflected in the generation of a voltage signal controlling the operation of electromagnetic relays for energizing indicators. Recognition of the indicators, visual and audible, will inform the surgeon as to the possible existence of a shock and arc hazard. Equipment for this purpose has in varying degrees proven acceptable. Such equipment operation, however, has been subject to problems introduced by the characteristics of electromagnetic relays, e.g., variances in the pull-in and drop-out voltages and chattering. In addition, the circuitry employed has not provided the control necessary to maintain and assure a constant predictable level of indication. The invention herein described has overcome these difficulties by establishing triggering and switching circuitry enabling ground detection completely independent of the relay characteristics. Thus, it is an object of this invention to provide a ground detector entirely free of the ambiguities introduced by relay parameters.

It is a further object of this invention to provide a highly reliable and constant level ground impedance indicator.

It is another object of this invention to provide a ground detector circuit containing triggering and switching circuitry.

Additional objects and purposes of this invention will become obvious upon a study and reading of the hereinafter disclosed description and drawings.

BRIEF DESCRIPTION OF DRAWINGS

To permit incisive and detailed analysis of the operational characteristics of this invention, a single figure of a schematic drawing showing specific circuitry is attached. This drawing discloses one form of the invention and is not meant in any way to delimit its scope, it is rather so drawn as to aid in an understanding of the invention. Standard electrical symbols are used.

DESCRIPTION OF THE PREFERRED EMBODIMENTS

The structure of this invention as illustrated may be thought of as containing three sections. First, the operating room equipment 57 to be monitored; a second section 54 containing the remote indication equipment, namely, switches, indicator lights, and buzzer; and the remaining section containing the actual circuitry involved with determining the level of resistance and capacitive reactance.

In broad terms during actual use, the surgeon or an assistant surveys the equipment. Under normal conditions, the "normal" indication light 7 is energized. If at any time the resistance and capacitive reactance to ground value falls below the specified limit of 60,000 ohms, the normal operating indicator light 7 shuts off and the alert indicator light 5 and buzzer 9 are energized, giving both a visual and audible indication. Usually the surgeon will instruct that the buzzer 9 be shut off by means of an associated switch 8 and the surgical operation continued.

At the end of the surgical operation and after the room has been cleared of both personnel and flammable atmosphere, proper maintenance and trouble-shooting procedures are applied to find the breakdown. Also contained in this equipment is a test switch 4 whereby a ground is deliberately applied to one side or the other of the isolated power supply lines 58 and 59 to determine if the ground detector is properly functioning.

To enable full understanding of this invention and the concepts utilized therein, a detailed and explicit description of the circuit and its operating characteristics are now presented. The main supply transformer 1 contains a secondary winding completely insulated and isolated, except for some small capacitive coupling, from ground. The output of this secondary is conducted through lines 58 and 59, terminals 2 and 1 of terminal board 55, and fuses 10 and 11 respectively to a bridge circuit comprising, resistor 15, capacitor 14, serially connected between line 58, and 59, and a detector circuit. The other legs of the bridge circuit are formed by the impedance to ground of lines 58 and 59.

The detector circuit is joined to the junction of capacitor 14 and resistor 15 and consists of a series connected resistor 13 and capacitor 12 conducted to the junction of diodes 16, and 17 which comprise part of a full-wave bridge rectifier formed by diodes 16, 17, 18 and 19. The junction of diodes 18 and 19 is conducted to ground and the current drawn through the detector circuit during normal use is less than 2 milliamperes under any fault condition external to the detector. The output of the full-wave bridge rectifier is filtered by a network composed of capacitor 20 and parallel potentiometer 21 connected across the rectifier output. The potentiometer 21 is also used to calibrate the system sensitivity level to produce indications in accordance with and relative to specified values of impedance.

As a resistance or capacitance forms between either or both lines 58 and 59 of the power source and ground, a composite signal relative to resistance and capacitance is applied to the detector circuit. Should an approximately equal ground resistance form on both lines, bridge current cancellation is substantially negligible due to the phase shift introduced by capacitor 14. The signal is rectified, by the detector diodes 16, 17, 18 and 19, and filtered to a substantially direct current. The output of the filter circuit, taken from the arm of potentiometer 21, is applied to the base of transistor 32. Transistor 32 in conjunction with resistors 30 and 33 and diode 31 form an amplifier circuit for the detector output signal. Resistor 30 and diode 31 establish the biasing circuit for the amplifier. When the detector output signal rises above a particular level the base-emitter junction of transistor 32 is forward biased and consequentially transistor 32 conducts. Diode 31 provides a threshold voltage which must be exceeded before transistor 32 base-emitter junction is forward biased. Resistor 33 forms the load resistance for transistor 32.

The output of the amplifier is in turn, through resistor 34, conducted to the base of transistor 35. Transistor 35 forms a part of one form of Schmitt trigger circuit whereby, a rise above or below predetermined levels of signal input on the base of transistor 35, produces a sharp wave front output of increasing or decreasing magnitude. The Schmitt trigger circuit consists of transistors 35 and 40 and resistors 36, 37, 38, 39 and 41. Resistors 37 and 41 supply load resistance for transistors 35 and 40 respectively. Resistors 37, 38 and 39 form the bias resistor combination for transistor 40 and resistor 36 provides a common emitter resistor for both transistors. Analysis of this trigger circuit shows that initially transistor 35 is biased to a nonconducting state while transistor 40 is conversely and necessarily biased to a full conducting state (this being necessary because the Schmitt trigger circuit is a fully saturated bistable network). As the output of the amplifier increases to a specific threshold value determined by the setting of potentiometer 21 and the circuit biasing, transistor 35 is forced into a conducting state. When this occurs, the regenerative characteristics of the network come to the fore and transistor 35 continues to increase in conductance until it is fully saturated while transistor 40 rapidly and substantially instantaneously shuts off into a non-conducting state.

The rapid change in conduction levels of transistors 35 and 40 is effected by the change in conductance of transistor 35 as the output of transistor 32 increases or decreases. When transistor 32 conducts sufficiently as established by bias circuit parameters, transistor 35 will become conductive, this causes an increase in the voltage across resistor 36 which changes the bias on transistor 40, causing transistor 40 to come out of saturation. The decrease in conductance of transistor 40 again forces the voltage across resistor 36 to decrease thereby once again increasing the conductance of transistor 35. This regenerative action continues until transistor 35 becomes saturated and transistor 40 non-conductive. At the same time the current thru resistor 37 increases and is effective in decreasing the biasing signal on the base of transistor 40 to a level under that necessary to maintain conductance. A reverse regenerative action takes place when the voltage, in response to an increase of line impedance to ground, on the base of transistor 35 is reduced to a level below that necessary to maintain saturation of transistor 35.

In actual operation the trigger circuit output, as seen on the collector of transistor 40, substantially instantaneously increases to a value approaching that of the circuit power supply, which in this instance is −24 volts, when the detector signal rises above a first predetermined threshold magnitude and connects through resistor 42 to the base of transistor 43. This transistor 43 combined with Zener diode 44, diode 47, resistor 48 and relay winding 46 establishes a highly stable biased switching network. Diode 47 provides circuit protection by shorting out the inductive surges of relay winding 46 whenever transistor 43 switches to a non-conducting state. As transistor 40, of the triggering circuit, is forced abruptly to a non-conducting state, the switching circuit, formed by transistor 43, at a controlled operating point, determined by Zener diode 44 is in like manner switched to a highly conductant state. The presence of Zener diode 44 assures that the switching circuit will follow the bistable characteristics of the Schmitt trigger and only be in either a full conducting or non-conducting state. As a result, relay winding 46 is immediately energized and changes the indication aspect from a normal to an alert and at the same time instigates operation of the warning buzzer. Thus, both a visual and audible indication, impossible to ignore, is presented to the personnel present in the operating area, whenever the line to ground resistance and capacitive reactance falls below the predetermined level of desired or specified detection. Similarly the trigger circuit is again abruptly altered and the switching transistor 43 is completely shut off when the impedance rises above the threshold level or in other words the signal falls below a second predetermined value. Thusly, the variance between the pull-in and drop-out voltage of the electromagnetic relay 46 (sometimes varying by as large a factor as 5 to1) fails to affect the indicating level of the ground detector. This means that the establishing of indications as well as their clearing is accomplished at substantially the same level of impedance to ground. Further it is noted, that to avoid the possibility of oscillation when the impedance to ground is just at the threshold level, hysterisis is added to the circuit by the presence of a resistor 45 in series with the circuit power supply. When transistor 43 conducts, the current drawn from the power supply increases, causing a resultant drop in voltage applied to the detector circuitry and prevents the Schmitt trigger from switching back until the impedance level is increased to some second predetermined value above the threshold setting.

The indicator circuitry and the detector circuitry power supply are powered from transformers 28 and 29 respectively. The output voltage of the secondary of these transformers is 24 volts, commensurate with the operating voltage levels of the power supply components, and the transistor and the indicator circuitry. Relay 46 controls actuation of the specified indications provided in the following manner: Contacts 23 (normally closed) and 24 (normally open) of relay 46 are connected to one side of transformer 28. Contact 23 establishes a circuit connecting one side of the transformer 28 winding to terminal 8 on terminal board 55 of the remote equipment 54. This terminal in turn connects to the normal indicator light 7 which through resistor 6, terminal 3 and a wire 56 electrically connects to the other side of the secondary winding of transformer 28. Obviously this energizes the normal indicator lamp 7.

When relay 46 is energized, contact 23 opens, extinguishing the normal indicator lamp 7, and contact 24 closes resulting in the following indications: Contact 24 connects one side of the secondary of transformer 28 to the alert lamp 5 while the other side of this lamp is connected through terminal 3 of terminal board 55 to the other side of the transformer 28 secondary winding in similar fashion as that described for indicator lamp 7. This immediately results in the energization of indicator lamp 5 presenting an alert aspect. At the same instant, contact 24 electrically connects through the normally closed contact 25 of relay 27 to terminal 10 of terminal board 55 which connects to a buzzer 9, thus, in addition to the visual alert aspect, presenting an audible indication of circuit malfunction. To enable operating personnel to end the audible indications, which is a source of annoyance, a switch 8 is provided whereby relay 27 is energized, opening contact 25 and preventing buzzer opeartion. Relay 27 is held in this energized state by the closing of its stick contact 26, and as long as relay 46 remains energized, will stick or continuously energize itself across the secondary winding of transformer 28.

The circuit power supply previously referred to is one of standard design and any commonly adaptable power supply source would serve the purpose. The particular circuit used in this invention consists of a full-wave rectifier formed by diodes 50, 51, 52 and 53 in conjunction with filtering capacitor 49 and resistor 45, and provides a D.C. voltage of approximately +24 volts with a ripple factor consistent with direct current supply requirements for transistor circuitry.

A feature briefly mentioned in the initial description of the invention is the detector test switch 4. This is a three position switch i.e. on, neutral and on, and is contained in the remote equipment 54. The arm of the switch connects through terminal 5 of terminal board 55 to resistor 22 and thence to ground through terminal 6. The contacts of the switch connect through terminals 1 and 2 to the power source lines 59 and 58 respectively. Dependent upon the position in which the switch is placed, a conductance path through resistor 22 or an open circuit is presented to either line. When either line is connected to ground, both the alert indicator 7 and buzzer 9 should give their respective alarms. Failure to so indicate means possible malfunction in the ground detector equipment. Also, contained in the remote equipment section 54 is an ammeter 2, which when placed in the circuit by plug in jack 3, measures the current drawn from the junction of diodes 18 and 19 to ground, thus permitting an immediate measurable indication of the current through the detector which as specified must not exceed 2 milliamperes under any condition of line fault external to the detector.

Consideration of the foregoing operational analysis indicates that this invention conforms to stated objects and goals. The use of triggering circuitry, bias controlled switching and threshold setting frees the ground detector indications from any dependence upon either the pull-in or drop-out voltage levels as well as variance in operating characteristics of the relays. The trigger circuitry presents an extremely sharp and substantially instantaneous voltage change which in turn initiates the full conductance or non-conductance of the transistor switch. Since the relay winding is in the collector circuit of the transistor switch, the full conductance or absolute non-conductance will pull-in or drop-out the relay solely dependent upon the electromechanical time constant of the relay and the inductive surge protection diode 47.

The form of invention herein presented is intended to be exemplary and therefore is inclusive of all those possible modifications and variations which become obvious to one skilled in the art upon a reading of the disclosure.

What is claimed is:

1. A ground fault detector comprising, in combination:
   bridge detector means having the impedance to ground of the lines of an alternating current source as elements, and energy storage impedance elements arrayed across said lines foaming additional elements for producing a composite signal relative to the impedance to ground of said lines, and in which the phase shift introduced by said impedance elements substantially prevents cancellation of the portion of said composite signal relative to the impedance to ground of each of said lines;
   a circuit means having a normal output signal level responsively coupled to said bridge detector means including
   an amplifier for amplifying said signal;
   a bistable trigger circuit responsive to said amplified signal for generating a substantially instantaneous change in said output signal level to a second level whenever said signal reaches a predetermined value corresponding to said impedance to ground below a minimum limit and for returning substantially instantaneously to said output signal level whenever said signal reaches a second predetermined value, said circuit means being biased so that said second predetermined value is lower than said first value for preventing oscillation between said output levels;
   switching means responsive to said second level for indicating said low impedance to ground including, a transistor with its base coupled to said bistable circuit which conductance state substantially instantaneously is switched in conjunction with said changes in output voltage levels and, a relay coupled to the output of said transistor responsive to said conductance state giving an indication of said impedance decreasing below said minimum limit; and
   impedance means, including a resistor serially coupled to said circuit means and said switching means for biasing said circuit means to be responsive to said second predetermined value, whenever said switching means changes conductance state relative to said low impedance to ground.

References Cited

UNITED STATES PATENTS

| | | | |
|---|---|---|---|
| 2,022,758 | 12/1935 | Corderman | 340—255 |
| 2,700,125 | 1/1955 | King et al. | 324—51 XR |
| 2,989,694 | 6/1961 | Fath et al. | 340—255 XR |
| 2,999,231 | 9/1961 | Kusters et al. | 340—255 |
| 3,066,284 | 11/1962 | McKinley et al. | 324—51 XR |
| 3,205,445 | 9/1965 | Cubert | 328—150 |
| 3,209,268 | 9/1965 | Fraunfelder et al. | 328—150 XR |
| 3,218,622 | 11/1965 | Gardner | 340—255 |
| 3,300,689 | 1/1967 | Beddoes | 317—31 XR |
| 3,354,386 | 11/1967 | Daigle et al. | 324—51 |
| 3,201,775 | 8/1965 | Pedersen | 340—258 |
| 3,407,314 | 10/1968 | Wolff | 317—31 XR |

GERARD R. STRECKER, Primary Examiner

U.S. Cl. X.R.

324—54; 340—255